United States Patent
Hu et al.

(10) Patent No.: US 11,138,171 B2
(45) Date of Patent: Oct. 5, 2021

(54) PASSENGER FLOW INFORMATION COLLECTION METHOD AND APPARATUS, AND PASSENGER FLOW INFORMATION PROCESSING METHOD AND APPARATUS

(71) Applicant: Hangzhou Hikvision Digital Technology Co., Ltd., Zhejiang (CN)

(72) Inventors: Zhigang Hu, Zhejiang (CN); Hui Gong, Zhejiang (CN); Shiliang Pu, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 503 days.

(21) Appl. No.: 15/780,812

(22) PCT Filed: Jun. 2, 2016

(86) PCT No.: PCT/CN2016/084525
§ 371 (c)(1),
(2) Date: Jun. 1, 2018

(87) PCT Pub. No.: WO2017/092269
PCT Pub. Date: Jun. 8, 2017

(65) Prior Publication Data
US 2018/0365275 A1     Dec. 20, 2018

(30) Foreign Application Priority Data
Dec. 3, 2015 (CN) .............................. 201510875278

(51) Int. Cl.
*G06K 9/00* (2006.01)
*G06F 16/22* (2019.01)
(Continued)

(52) U.S. Cl.
CPC ..... *G06F 16/2228* (2019.01); *G06K 9/00201* (2013.01); *G06K 9/00369* (2013.01);
(Continued)

(58) Field of Classification Search
None
See application file for complete search history.

(56) References Cited

U.S. PATENT DOCUMENTS

| 5,465,115 A | 11/1995 | Conrad et al. |
| 2003/0107649 A1 | 6/2003 | Flickner et al. |

(Continued)

FOREIGN PATENT DOCUMENTS

| CN | 1971628 A | 5/2007 |
| CN | 101847206 A | 9/2010 |

(Continued)

*Primary Examiner* — Tuankhanh D Phan
(74) *Attorney, Agent, or Firm* — Bret E. Field; Bozicevic, Field & Francis LLP

(57) ABSTRACT

A method and apparatus for acquiring people flow information, and a method and apparatus for processing people flow information are provided. The method for acquiring people flow information comprises: detecting entering and leaving of a target scene by people; determining specific attribute data of people flow entering and leaving the target scene, wherein, the specific attribute data includes at least a target number of people, among the detected people, which enters and leaves the target scene at the same time; and performing an operation of acquiring people flow information about the target scene, wherein, the operation of acquiring people flow information about the target scene includes at least: selecting, from a plurality of first-type counting modules, a first-type counting module corresponding to a predetermined number range of people within which the target number falls, and increasing a count value of the first-type counting module by 1, wherein, each first-type counting module corresponds to one of predetermined number ranges of people. The purpose of acquiring people flow information having a higher value in terms of business analysis, deep data mining and so on can be achieved by the solutions above.

20 Claims, 4 Drawing Sheets

(51) Int. Cl.
   *G06K 9/46*   (2006.01)
   *G06K 9/20*   (2006.01)
   *G07C 9/30*    (2020.01)

(52) U.S. Cl.
   CPC ..... *G06K 9/00677* (2013.01); *G06K 9/00724* (2013.01); *G06K 9/00778* (2013.01); *G06K 9/2018* (2013.01); *G06K 9/4652* (2013.01); *G07C 9/30* (2020.01)

(56) References Cited

U.S. PATENT DOCUMENTS

| | | | | |
|---|---|---|---|---|
| 2008/0024610 | A1* | 1/2008 | Konishi | H04N 5/232 348/159 |
| 2015/0199575 | A1* | 7/2015 | Dudovich | G06F 16/51 382/103 |
| 2016/0055645 | A1* | 2/2016 | Ito | G06T 7/246 382/103 |

FOREIGN PATENT DOCUMENTS

| | | | | |
|---|---|---|---|---|
| CN | 101872422 | A | | 10/2010 |
| CN | 101872431 | A | | 10/2010 |
| CN | 101877058 | A | | 11/2010 |
| CN | 102930272 | A | * | 2/2013 |
| CN | 103824114 | A | | 5/2014 |
| CN | 105069816 | A | | 11/2015 |
| JP | 2015158819 | A | | 9/2015 |

\* cited by examiner

US 11,138,171 B2

PASSENGER FLOW INFORMATION COLLECTION METHOD AND APPARATUS, AND PASSENGER FLOW INFORMATION PROCESSING METHOD AND APPARATUS

The present application claims the priority to a Chinese patent application No. 201510875278.8, filed with the State Intellectual Property Office of People's Republic of China on Dec. 3, 2015 and entitled "METHOD AND APPARATUS FOR ACQUIRING PEOPLE FLOW INFORMATION, AND METHOD AND APPARATUS FOR PROCESSING PEOPLE FLOW INFORMATION", which is incorporated herein by reference in its entirety.

TECHNICAL FIELD

The application relates to the field of data processing technology, and in particular to a method and apparatus for acquiring people flow information, and a method and apparatus for processing people flow information.

BACKGROUND

Acquisition of people flow information provides an important data source for business analysis. Such people flow information may be acquired by means of various technologies, for example, based on infrared curtain, video analysis, or depth cameras. Existing approaches for acquiring people flow information, irrespective of the technology employed, are all intended to obtain a total number of people that enters and leaves a place within a time period. However, such people flow information may be of limited value in terms of business analysis and deep data mining.

Therefore, how to acquire people flow information that has a higher value in terms of business analysis, deep data mining and so on is a pressing issue to be solved.

SUMMARY

Embodiments of the present application are directed to a method and apparatus for acquiring people flow information, and a method and apparatus for processing people flow information.

In a first aspect, a method for acquiring people flow information is provided by an embodiment of the present application. The method is applicable to a people flow information acquiring device, including:

detecting entering and leaving of a target scene by people;
determining specific attribute data of people flow entering and leaving the target scene, wherein, the specific attribute data includes at least a target number of people, among the detected people, which enters and leaves the target scene at the same time; and
performing an operation of acquiring people flow information about the target scene, wherein, the operation of acquiring people flow information about the target scene includes at least:
selecting, from a plurality of first-type counting modules, a first-type counting module corresponding to a predetermined number range of people within which the target number falls, and increasing a count value of the first-type counting module by 1, wherein each of the first-type counting modules corresponds to one of predetermined number ranges of people.

Optionally, the people flow information acquiring device includes an image acquiring device; and detecting entering and leaving of a target scene by people includes:
detecting, based on a video analysis technology, the entering and leaving of the target scene by people.

Optionally, determining specific attribute data of people flow entering and leaving the target scene, wherein, the specific attribute data includes at least a target number of people, among the detected people, which enters and leaves the target scene at the same time, includes:
determining, based on time information for the detected people, the target number of people, among the detected people, which enters and leaves the target scene at the same time.

Optionally, the specific attribute data further includes:
a target clothing color of the detected people;
determining specific attribute data of people flow entering and leaving the target scene, wherein, the specific attribute data includes at least a target number of people, among the detected people, which enters and leaves the target scene at the same time, includes:
determining, based on time information for the detected people, the target number of people, among the detected people, which enters and leaves the target scene at the same time; and
determining a target clothing color of the detected people based on an image analysis technology; and
the operation of acquiring people flow information about the target scene further includes:
selecting, from a plurality of second-type counting modules, a second-type counting module corresponding to a predetermined color range within which the target clothing color falls, and increasing a count value of the second-type counting module by 1, wherein, each of the second-type counting modules corresponds to one of predetermined color ranges.

Optionally, the people flow information acquiring device includes an infrared detection device;
detecting entering and leaving of a target scene by people includes:
detecting, based on an infrared detection technology, the entering and leaving of the target scene by people; and
determining specific attribute data of people flow entering and leaving the target scene, wherein, the specific attribute data includes at least a target number of people, among the detected people, which enters and leaves the target scene at the same time, includes:
determining, based on distance information between the infrared detection device and the detected people, the target number of people, among the detected people, which enters and leaves the target scene at the same time.

Optionally, the people flow information acquiring device includes a depth analysis device; and
detecting entering and leaving of a target scene by people includes:
detecting, based on a depth analysis technology, the entering and leaving of the target scene by people.

Optionally, determining specific attribute data of people flow entering and leaving the target scene, wherein, the specific attribute data includes at least a target number of people, among the detected people, which enters and leaves the target scene at the same time, includes:
determining, based on depth information for the detected people, the target number of people, among the detected people, which enters and leaves the target scene at the same time.

Optionally, the specific attribute data further includes a target height of the detected people;

determining specific attribute data of people flow entering and leaving the target scene, wherein, the specific attribute data includes at least a target number of people, among the detected people, which enters and leaves the target scene at the same time, includes:

determining, based on the depth information for the detected people, the target number of people, among the detected people, which enters and leaves the target scene at the same time, and a target height of the detected people; and the operation of acquiring people flow information about the target scene further includes:

selecting, from a plurality of third-type counting modules, a third-type counting module corresponding to a predetermined height range within which the target height falls, and increasing a count value of the third-type counting module by 1, wherein each of the third-type counting modules corresponds to one of predetermined height ranges.

Optionally, the method for acquiring people flow information provided by the embodiment of the present application further includes:

performing periodically an operation of storing, by taking a time period as index information, a relationship between a count value of each first-type counting module and a corresponding predetermined number range of people, and resetting the count value of each first-type counting module after the operation of storing is finished.

Optionally, the method for acquiring people flow information provided by the embodiment of the present application further includes:

performing periodically an operation of storing, by taking a time period as index information, a relationship between a count value of each first-type counting module and a corresponding predetermined number range of people, and an operation of storing, by taking a time period as index information, a relationship between a count value of each second-type counting module and a corresponding predetermined color range, and resetting the count value of each first-type counting module and the count value of each second-type counting module after these operations of storing are finished.

Optionally, the method for acquiring people flow information provided by the embodiment of the present application further includes:

performing periodically an operation of storing, by taking a time period as index information, a relationship between a count value of each first-type counting module and a corresponding predetermined number range of people, and an operation of storing, by taking a time period as index information, a relationship between a count value of each third-type counting module and a corresponding predetermined height range, and resetting the count value of each first-type counting module and the count value of each third-type counting module after these operations of storing are finished.

In a second aspect, an apparatus for acquiring people flow information is provided by an embodiment of the present application. The apparatus is applicable to a people flow information acquiring device, including:

an entering and leaving detection module configured to detect entering and leaving of a target scene by people;

a specific attribute data determining module configured to determine specific attribute data of people flow entering and leaving the target scene, wherein, the specific attribute data includes at least a target number of people, among the detected people, which enters and leaves the target scene at the same time; and an information acquiring module configured to perform an operation of acquiring people flow information about the target scene, wherein, the operation of acquiring people flow information about the target scene includes at least:

selecting, from a plurality of first-type counting modules, a first-type counting module corresponding to a predetermined number range of people within which the target number falls, and increasing a count value of the first-type counting module by 1, wherein, each of the first-type counting modules corresponds to one of predetermined number ranges of people.

In a third aspect, a method for processing people flow information is provided by an embodiment of the present application. The method is applicable to a people flow information acquiring device, including:

obtaining an instruction of processing people flow information, which carries a target time period identifier;

obtaining, from source data of people flow about a target scene pre-stored and indexed by a time period, target source data of people flow within a target time period corresponding to the target time period identifier; wherein, the source data of people flow is determined based on the method for acquiring people flow information of claim 1, and includes at least a relationship between a count value of each first-type counting module and a corresponding predetermined number range of people, wherein, each first-type counting module corresponds to one of predetermined number ranges of people, which are ranges of the number of people that enters and leaves the target scene at the same time; and determining statistical information of people flow of the target scene within the target time period corresponding to the target time period identifier based on the relationship, which is contained in the target source data of people flow, between a count value of each first-type counting module and a corresponding predetermined number range of people.

Optionally, before obtaining an instruction of processing people flow information, the method further includes:

obtaining periodically the source data of people flow about the target scene from a people flow information acquiring device, and storing the obtained source data of people flow about the target scene by taking a time period as index information;

obtaining, from source data of people flow about a target scene pre-stored and indexed by a time period, target source data of people flow within a target time period corresponding to the target time period identifier includes:

obtaining, from source data of people flow about the target scene locally pre-stored and indexed by a time period, the target source data of people flow within the target time period corresponding to the target time period identifier.

Optionally, obtaining, from source data of people flow about a target scene pre-stored and indexed by a time period, target source data of people flow within a target time period corresponding to the target time period identifier includes:

obtaining, from source data of people flow about the target scene pre-stored in an external storage device and indexed by a time period, the target source data of people flow within the target time period corresponding to the target time period identifier;

wherein, the external storage device obtains periodically the source data of people flow about the target scene from a people flow information acquiring device, and stores the obtained source data of people flow about the target scene by taking a time period as index information.

Optionally, determining statistical information of people flow of the target scene within the target time period corresponding to the target time period identifier based on the relationship, which is contained in the target source data of people flow, between a count value of each first-type counting module and a corresponding predetermined number range of people includes:

determining a ratio between the number of people for each predetermined number range of people and the total number of people in the target scene within the target time period corresponding to the target time period identifier, based on the relationship, which is contained in the target source data of people flow, between a count value of each first-type counting module and a corresponding predetermined number range of people.

Optionally, the source data of people flow further includes: a relationship between a count value of each second-type counting module and a corresponding predetermined color range, wherein, each second-type counting module corresponds to one of predetermined color ranges, which are ranges of clothing colors of people;

determining statistical information of people flow of the target scene within the target time period corresponding to the target time period identifier based on the relationship, which is contained in the target source data of people flow, between a count value of each first-type counting module and a corresponding predetermined number range of people includes:

determining the statistical information of people flow of the target scene within the target time period corresponding to the target time period identifier, based on the relationship between a count value of each first-type counting module and a corresponding predetermined number range of people and the relationship between a count value of each second-type counting module and a corresponding predetermined color range, which are contained in the target source data of people flow.

Optionally, determining the statistical information of people flow of the target scene within the target time period corresponding to the target time period identifier, based on the relationship between a count value of each first-type counting module and a corresponding predetermined number range of people and the relationship between a count value of each second-type counting module and a corresponding predetermined color range, which are contained in the target source data of people flow, includes:

determining a ratio between the number of people for each predetermined number range of people and the total number of people in the target scene within the target time period corresponding to the target time period identifier, based on the relationship, which is contained in the target source data of people flow, between a count value of each first-type counting module and a corresponding predetermined number range of people; and determining a ratio between the number of people for each predetermined color range and the total number of people in the target scene within the target time period corresponding to the target time period identifier, based on the relationship, which is contained in the target source data of people flow, between a count value of each second-type counting module and a corresponding predetermined color range.

Optionally, the source data of people flow further includes a relationship between a count value of each third-type counting module and a corresponding predetermined height range, wherein, each third-type counting module corresponds to one of predetermined height ranges, which are ranges of heights of people;

determining statistical information of people flow of the target scene within the target time period corresponding to the target time period identifier based on the relationship, which is contained in the target source data of people flow, between a count value of each first-type counting module and a corresponding predetermined number range of people includes:

determining the statistical information of people flow of the target scene within the target time period corresponding to the target time period identifier, based on the relationship between a count value of each first-type counting module and a corresponding predetermined number range of people and the relationship between a count value of each third-type counting module and a corresponding predetermined height range, which are contained in the target source data of people flow.

Optionally, determining the statistical information of people flow of the target scene within the target time period corresponding to the target time period identifier, based on the relationship between a count value of each first-type counting module and a corresponding predetermined number range of people and the relationship between a count value of each third-type counting module and a corresponding predetermined height range, which are contained in the target source data of people flow, includes:

determining a ratio between the number of people for each predetermined number range of people and the total number of people in the target scene within the target time period corresponding to the target time period identifier, based on the relationship, which is contained in the target source data of people flow, between a count value of each first-type counting module and a corresponding predetermined number range of people; and determining a ratio between the number of people for each predetermined height range and the total number of people in the target scene within the target time period corresponding to the target time period identifier, based on the relationship, which is contained in the target source data of people flow, between a count value of each third-type counting module and a corresponding predetermined height range.

In a fourth aspect, an apparatus for processing people flow information is provided by an embodiment of the present application. The apparatus is applicable to a people flow information processing device. The apparatus includes:

a processing instruction obtaining module configured to obtain an instruction of processing people flow information, which carries a target time period identifier;

a data obtaining module configured to obtain, from source data of people flow about a target scene pre-stored and indexed by a time period, target source data of people flow within a target time period corresponding to the target time period identifier; wherein, the source data of people flow is determined based on the method for acquiring people flow information of claim 1, and includes at least a relationship between a count value of each first-type counting module and a corresponding predetermined number range of people, wherein, each first-type counting module corresponds to one of predetermined number ranges of people, which are ranges of the number of people that enters and leaves the target scene at the same time; and an information statistics module configured to determine statistical information of people flow of the target scene within the target time period corresponding to the target time period identifier, based on the relationship, which is contained in the target source data of people flow, between a count value of each first-type counting module and a corresponding predetermined number range of people.

In a fifth aspect, a storage medium is provided by an embodiment of the present application. The storage medium is configured to store an application program, which, when being executed, performs the method for acquiring people flow information provided by the first aspect of the present application.

In a sixth aspect, a storage medium is provided by an embodiment of the present application. The storage medium is configured to store an application program, which, when being executed, performs the method for processing people flow information provided by the third aspect of the present application.

In a seventh aspect, an application program is provided by an embodiment of the present application. The application program is configured to, when being executed, perform the method for acquiring people flow information provided by the first aspect of the present application.

In an eighth aspect, an application program is provided by an embodiment of the present application. The application program is configured to, when being executed, perform the method for processing people flow information provided by the third aspect of the present application.

In a ninth aspect, a people flow information acquiring device is provided by an embodiment of the present application, including a processor, a memory, a communication interface, and a bus; wherein, the processor, the memory, and the communication interface are communicatively connected with each other by the bus;

the memory is configured to store executable program codes; and the processor is configured to execute a program corresponding to the executable program codes by reading the executable program codes stored in the memory, in order to perform the method for acquiring people flow information provided by the first aspect of the present application.

In a tenth aspect, a people flow information processing device is provided by an embodiment of the present application, including a processor, a memory, a communication interface, and a bus; wherein, the processor, the memory, and the communication interface are communicatively connected with each other by the bus;

the memory is configured to store executable program codes; and the processor is configured to execute a program corresponding to the executable program codes by reading the executable program codes stored in the memory, in order to perform the method for processing people flow information provided by the third aspect of the present application.

In the method and apparatus for acquiring people flow information, instead of merely obtaining a total number of people that enters and leaves a target scene within a time period, specific attribute data of the people flow entering and leaving a target scene is determined. The specific attribute data includes at least a target number of people, among the detected people, which enters and leaves the target scene at the same time. As such, a first-type counting module corresponding to a predetermined number range of people within which the target number falls may be selected from a plurality of first-type counting modules, and a count value of the selected first-type counting module is increased by 1. Thus, the purpose of acquiring people flow information having a higher value in terms of business analysis, deep data mining and so on can be achieved by the solutions above.

In addition, in the method and apparatus for processing people flow information, the statistical processing of people flow information acquired by the method for acquiring people flow information provided by embodiments of the present application is performed, thus reference data for business analysis, deep data mining and so on is further provided.

BRIEF DESCRIPTION OF THE DRAWINGS

To describe the technical solutions of embodiments of the application and the prior art more clearly, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION

In order to make the objectives, technical solutions, and advantages of the present application clearer and more understandable, the present application will be described in more detail below with reference to the appended drawings and embodiments. Obviously, the described embodiments are only some, and not all, of the embodiments of the present application. All other embodiments obtained based on the embodiments of the present application by those skilled in the art without any creative efforts fall into the scope of protection defined by the present application.

First, embodiments of the present application provide a method and apparatus for acquiring people flow information to fulfill the purpose of acquiring people flow information that has a higher value in terms of business analysis and deep data mining.

A method for acquiring people flow information provided by an embodiment of the present application is first introduced below.

It is noted that, the method for acquiring people flow information provided by embodiments of the present application may be applied to a people flow information acquiring device. In practical application, the people flow information acquiring device may include an image acquiring device, an infrared detection device, a depth sensor, or the like. In particular, the image acquiring device may be a smart camera or a terminal with video acquisition and analysis capabilities. It is also possible that the infrared detection device is an infrared curtain device. All these are feasible.

Figure 1:
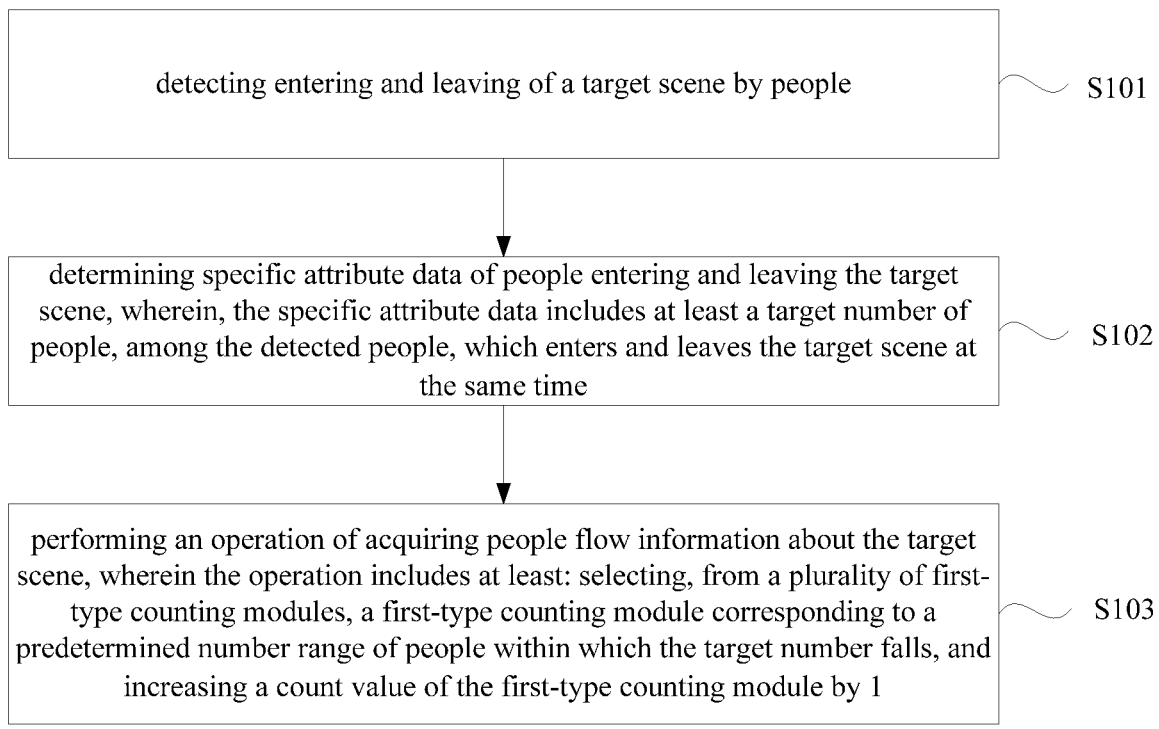
FIG. 1 is a flowchart of a method for acquiring people flow information provided by an embodiment of the present application.

As shown in FIG. 1, a method for acquiring people flow information provided by an embodiment of the present application may include:

S101, detecting entering and leaving of a target scene by people;

In order to detect the entering and leaving of a target scene by people, the people flow information acquiring device is required to be mounted at a position where it has such an acquisition range that the area within the target scene can be distinguished from the area external to the target scene.

It is appreciated that, the detection of the entering and leaving of a target scene by people may be implemented in different manners, depending on different forms of the people flow information acquiring device. Specifically, (1) in the case where an image acquiring device is used as the people flow information acquiring device, detecting entering and leaving of a target scene by people may include detecting, based on video analysis technology, the entering and leaving of a target scene by people. The video analysis technology may include, in particular, moving object detection technologies and human body features recognition technologies known in the art. In other words, people entering and leaving the target scene may be detected through existing moving object detection technologies and human body features recognition technologies.

(2) in the case where an infrared detection device is used as the people flow information acquiring device, detecting entering and leaving of a target scene by people may include detecting, based on infrared detection technology, the entering and leaving of a target scene by people. The infrared detection technology may be an existing technology that performs detection by using infrared ray. In other words, people entering and leaving a target scene may be detected through existing infrared detection technology.

(3) in the case where a depth sensor is used as the people flow information acquiring device, detecting entering and leaving of a target scene by people may include detecting the entering and leaving of a target scene by people, based on depth analysis technology which is known in the art. In other words, people entering and leaving the target scene may be detected through existing depth analysis technology.

S102, determining specific attribute data of people flow entering and leaving the target scene, wherein the specific attribute data includes at least a target number of people, among the detected people, which enters and leaves the target scene at the same time.

The specific attribute data of the people flow entering and leaving the target scene may be determined during the process of detecting the entering and leaving of a target scene by people. The specific attribute data includes at least a target number of people, among the detected people, which enters and leaves the target scene at the same time. The specific attribute data may be further used to perform subsequent acquisition of people flow information.

It is appreciated that, the specific attribute data of the people flow entering and leaving the target scene may be determined in different manners, depending on different forms of the people flow information acquiring device. Specifically, (1) in the case where an image acquiring device is used as the people flow information acquiring device, determining specific attribute data of people flow entering and leaving the target scene wherein the specific attribute data includes at least a target number of people, among the detected people, which enters and leaves the target scene at the same time, may include: determining, based on time information about the detected people, the target number of people, among the detected people, which enters and leaves the target scene at the same time. It is appreciated that, some of multiple people detected may be considered to enter and leave the target scene at the same time if they correspond to the same time information. In this case, the target number of people that enters and leaves the target scene at the same time is determined to be the number of these people. However, one person may be considered to enter or leave the target scene alone if time information for this person is different from time information for other people. In this case, the target number of people that enters and leaves the target scene at the same time is determined to be 1.

(2) in the case where an infrared detection is used as the people flow information acquiring device, determining specific attribute data of people flow entering and leaving the target scene, wherein the specific attribute data includes at least a target number of people, among the detected people, which enters and leaves the target scene at the same time, may include: determining, based on distance information between the infrared detection device and the detected people, the target number of people, among the detected people, which enters and leaves the target scene at the same time. It is appreciated that, some of multiple people detected may be considered to enter and leave the target scene at the same time if they correspond to the same distance information. In this case, the target number of people that enters and leaves the target scene at the same time is determined as the number of these people. However, one person may be considered to enter or leave the target scene alone if distance information for this person is different from distance information for other people. In this case, the target number of people that enters and leaves the target scene at the same time is determined to be 1.

(3) in the case where a depth sensor is used as the people flow information acquiring device, determining specific attribute data of people flow entering and leaving the target scene, wherein the specific attribute data includes at least a target number of people, among detected people, which enters and leaves the target scene at the same time, may include: determining, based on depth information corresponding to the detected people, the target number of people, among detected people, which enters and leaves the target scene at the same time. It is appreciated that, some of multiple people detected may be considered to enter and leave the target scene at the same time if they correspond to the same depth information. In this case, the target number of people that enters and leaves the target scene at the same time may be determined as the number of these people. However, one person may be considered to enter or leave the target scene alone if depth information for this person is different from depth information for other people, and the target number of people that enters and leaves the target scene at the same time is determined to be 1.

S103, performing an operation of acquiring people flow information about the target scene, wherein, the operation of acquiring people flow information about the target scene includes at least: selecting, from a plurality of first-type counting modules, a first-type counting module corresponding to a predetermined number range of people within which the target number falls, and increasing a count value of the first-type counting module by 1.

After the target number of people, among the detected people, which enters and leaves the target scene at the same time, is determined, the operation of acquiring people flow information about the target scene may be performed, so as to acquire the people flow information about the target scene. The operation of acquiring people flow information about the target scene includes at least: selecting, from a plurality of first-type counting modules, a first-type counting module corresponding to a predetermined number range of people within which the target number falls, and increasing a count value of the first-type counting module by 1. Wherein, each of the first-type counting modules corresponds to one of predetermined number ranges of people.

It is noted that, a plurality of the first-type counting modules may be preset in the embodiment, each corresponding to one predetermined number range of people. When the target number falls within a predetermined number range of people, the first-type counting module corresponding to the predetermined number range of people is selected, and the count value of the first-type counting module is increased by 1. For example, a predetermined number range of people of 1 corresponds to a first-type counting module that is a one-people counting module. When a target number is determined to be 1, the count value of the one-people counting module is increased by 1. A predetermined number range of people of 2 corresponds to a first-type counting module that is a two-people counting module. When a target number is determined to be 2, the count value of the two-people counting module is increased by 1. A predetermined number range of people of 3 corresponds to a first-type counting module that is a three-people counting module. When a target number is determined to be 3, the count value of the three-people counting module is increased by 1. A predetermined number range of people of more than 3 corresponds to a first-type counting module that is a multi-people counting module. When a target number is determined to be 4 or more than 4, the count value of the multi-people counting module is increased by 1.

It is appreciated that, the first-type counting module may be provided in the people flow information acquiring device, or may be connected externally to the people flow information acquiring device. These are feasible.

In a specific implementation, an operation of storing, by taking a time period as index information, the relationship between the count value of each first-type counting module and the corresponding predetermined number range of people may be periodically performed. The count value of each first-type counting module is reset after the operation of storing is finished. As an example, for a period of 1 minute, the operation of storing, by taking a time period as index information, the relationship between the count value of each first-type counting module and the corresponding predetermined number range of people is periodically performed. The storage form is as follows:

TABLE 1

| Start time | End time | One people | Two people | Three people | Multiple people |
| --- | --- | --- | --- | --- | --- |
| 2015-7-15 08:01 | 2015-7-15 08:02 | 1 | 3 | 0 | 7 |
| 2015-7-15 08:02 | 2015-7-15 08:03 | 2 | 1 | 3 | 13 |

It is noted that, multiple first-type counting modules may share a total counting module for acquiring the actual number of the people. In addition, the relationship between the count value of each first-type counting module and the corresponding predetermined number range of people may be stored locally in the people flow information acquiring device, or may be stored in other devices. These are feasible.

In the embodiment, instead of simply obtaining a total number of people that enters and leaves a target scene within a period, specific attribute data of the people flow entering and leaving the target scene is determined. The specific attribute data includes at least a target number of people, among the detected people, which enters and leaves the target scene at the same time. As such, when people flow information is acquired, a counting module corresponding to a predetermined number range of people within which the target number falls may be selected from a plurality of first-type counting modules, and the count value of the selected counting module is then increased by 1. Thus, the purpose of acquiring people flow information having a higher value in terms of business analysis, deep data mining and so on can be achieved by the solutions above.

In the case where an image acquiring device is used as the people flow information acquiring device, clothing color of people may also be determined based on image analysis technology. Therefore, the clothing color of people may also be taken as the specific attribute data so that the people flow information may be enriched, and the value of the acquired people flow information in business analysis, deep data mining and so on may be further improved. Based on this idea, a method for acquiring people flow information is further provided according to an embodiment of the present application. The method may be applied to an image acquiring device that is used as the people flow information acquiring device. The image acquiring device may be a smart camera, a terminal with video acquisition and analysis capabilities, or the like.

Figure 2:
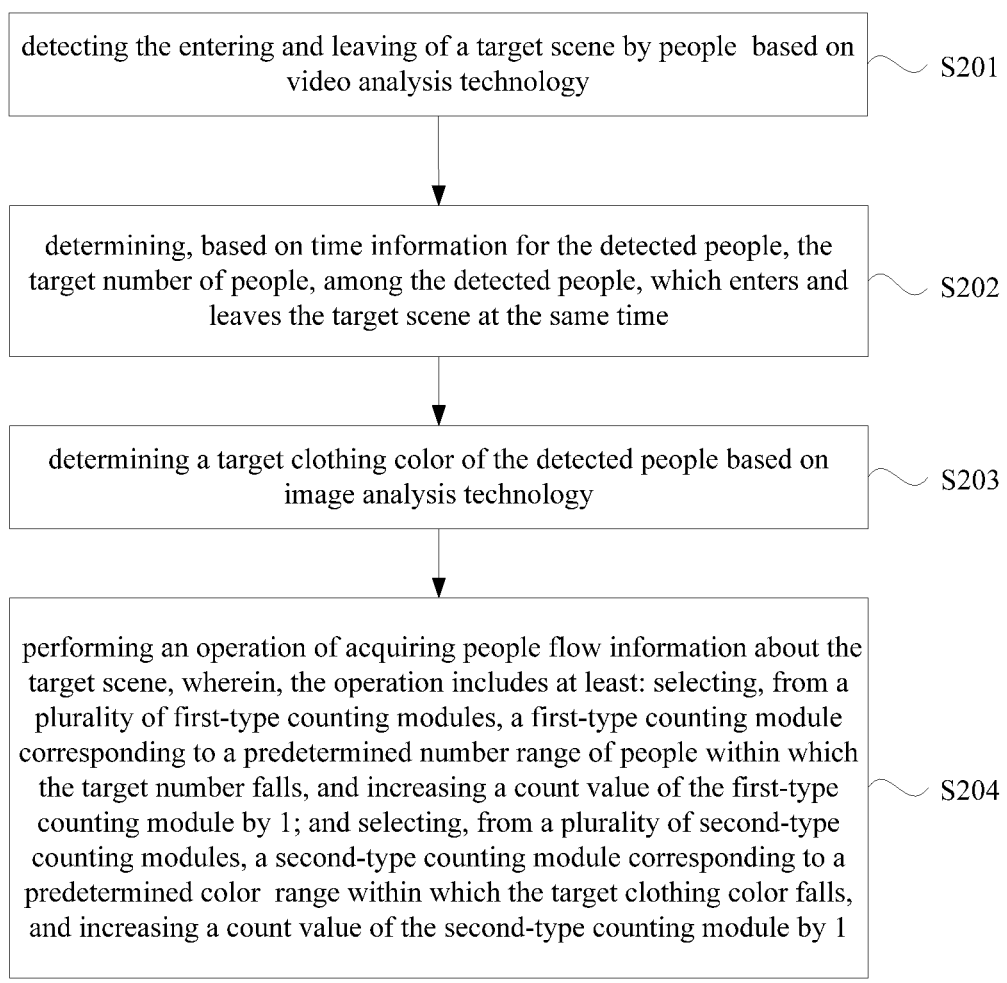
FIG. 2 is another flowchart of a method for acquiring people flow information provided by an embodiment of the present application.

As shown in FIG. 2, a method for acquiring people flow information provided according to an embodiment of the present application may include:

S201, detecting entering and leaving of a target scene by people based on video analysis technology.

In order to detect the entering and leaving of a target scene by people, the image acquiring device is required to be mounted on a position where it has such an acquisition range that the area within the target scene can be distinguished from the area external to the target scene.

The video analysis technology may include moving object detecting technologies or human body features recognition technologies known in the art. In other words, people entering and leaving a target scene may be detected through existing moving object detecting technologies or human body features recognition technologies.

S202, determining, based on the time information about the detected people, the target number of people, among the detected people, which enters and leaves the target scene at the same time.

S203, determining a target clothing color of the detected people based on image analysis technology.

Specific attribute data of people flow entering and leaving the target scene may be determined during the process of detecting the entering and leaving of the target scene by people. The specific attribute data may include a target number of people that enters and leaves the target scene at the same time among the detected people, and clothing color of the detected people. The specific attribute data may be further used to perform subsequent acquisition of people flow information.

Specifically, the target number of people, among the detected people, which enters and leaves the target scene at the same time may be determined based on the time information about the detected people. It is appreciated that, some of multiple people detected may be considered to enter and leave the target scene at the same time if they correspond to the same time information. In this case, the target number of people that enters and leaves the target scene at the same time may be determined to be the number of these people. However, one person may be considered to enter or leave the target scene alone if he corresponds to time information different from the others. In this case, the target number of people entering and leaving the target scene at the same time is determined to be 1.

Specifically, the clothing color of the detected people may be determined based on image analysis technology. The specific implementation thereof is known in the art.

S204, performing an operation of acquiring people flow information about the target scene, wherein, the operation of acquiring people flow information about the target scene includes at least: selecting, from a plurality of first-type counting modules, a first-type counting module corresponding to a predetermined number range of people within which the target number falls, and increasing a count value of the first-type counting module by 1; and selecting, from a plurality of second-type counting modules, a second-type counting module corresponding to a predetermined color range within which the target clothing color falls, and increasing a count value of the second-type counting module by 1.

Wherein, each of the first-type counting modules corresponds to one of the predetermined number ranges of people, and each of the second-type counting modules corresponds to one of the predetermined color ranges.

After the target number of people, among the detected people, which enters and leaves the target scene at the same time and the target clothing color of the detected people have been determined, a first-type counting module corresponding to a predetermined number range of people within which the target number falls may be selected from a plurality of first-type counting modules, and the count value of the first-type counting module is increased by 1; and a second-type counting module corresponding to a predetermined color range within which the target clothing color falls may be selected from a plurality of second-type counting modules, and the count value of the second-type counting module is increased by 1.

It is noted that, a plurality of the first-type counting modules may be preset in the embodiment, each corresponding to one predetermined number range of people. When the target number falls within a predetermined number range of people, the first-type counting module corresponding to the predetermined number range of people is selected, and the count value of the first-type counting module is increased by 1. For example, a predetermined number range of people of 1 corresponds to a first-type counting module that is a one-people counting module. When a target number is determined to be 1, the count value of the one-people counting module is increased by 1. A predetermined number range of people of 2 corresponds to a first-type counting module that is a two-people counting module. When a target number is determined to be 2, the count value of the two-people counting module is increased by 1. A predetermined number range of people of 3 corresponds to a first-type counting module that is a three-people counting module. When a target number is determined to be 3, the count value of the three-people counting module is increased by 1. A predetermined number range of people of more than 3 corresponds to a first-type counting module that is a multi-people counting module. When a target number is determined to be 4 or more than 4, the count value of the multi-people counting module is increased by 1.

Similarly, a plurality of the second-type counting modules may be preset in the embodiment, and each second-type counting module corresponds to one predetermined color range. If the target clothing color falls within a predetermined color range, the second-type counting module corresponding to the predetermined color range is selected, and the count value of the second-type counting module is increased by 1. For example, a predetermined color range is red, which corresponds to a second-type counting module that is a red counting module. When the target clothing color determined is red, the count value of the red counting module is increased by 1. A predetermined color range is blue, which corresponds to a second-type counting module that is a blue counting module. When the target clothing color determined is blue, the count value of the blue counting module is increased by 1. A predetermined color range is a color other than red and blue, which corresponds to a second-type counting module that is an other-color counting module. When the target clothing color determined is a color other than red and blue, the count value of the other-color counting module is increased by 1.

It is appreciated that, the first-type counting module and the second-type counting module may be provided in a people flow information acquiring device, or connected externally to the people flow information acquiring device. These are feasible.

In a specific implementation, an operation of storing, by taking a time period as index information, the relationship between the count value of each first-type counting module and the corresponding predetermined number range of people may be periodically performed. Also, an operation of storing, by taking a time period as index information, the relationship between the count value of each second-type counting module and the corresponding predetermined color range may be periodically performed. After the operation of storing is finished, the count value of each of the first-type counting modules and the second-type counting modules are reset. As an example, for a period of 1 minute, the operation of storing, by taking a time period as index information, the relationship between the count value of each first-type counting module and the corresponding predetermined number range of people may be periodically performed, and the operation of storing, by taking a time period as index information, the relationship between the count value of each second-type counting module and the corresponding predetermined color range may be periodically performed. The storage form for the first-type counting modules and the second-counting modules may be stored as shown in Table 1.

It is noted that, multiple first-type counting modules may share a total counting module for acquiring the actual number of the people. In addition, the relationship between the count value of each first-type counting module and the corresponding predetermined number range of people, and the relationship between the count value of each second-type counting module and the corresponding predetermined color range may be stored locally in the people flow information acquiring device, or may be stored in other devices. These are all feasible.

Thus, in comparison with the people flow information acquiring device provided by the embodiment including S101-S103, more specific attribute data may be obtained by people flow information acquisition in the present embodiment. Therefore, the value of the acquired people flow information in business analysis, deep data mining and so on may be further improved.

In the case where a depth sensor is used as the people flow information acquiring device, the height of people may also be determined based on depth analysis technology. Therefore, the height of people may also be taken as the specific attribute data so that the people flow information may be enriched, and the value of the acquired people flow information in business analysis, deep data mining and so on may be further improved. Based on this idea, a method for acquiring people flow information is further provided in an embodiment of the present application. The method may be applied to a depth sensor that is used as the people flow information acquiring device.

Figure 3:
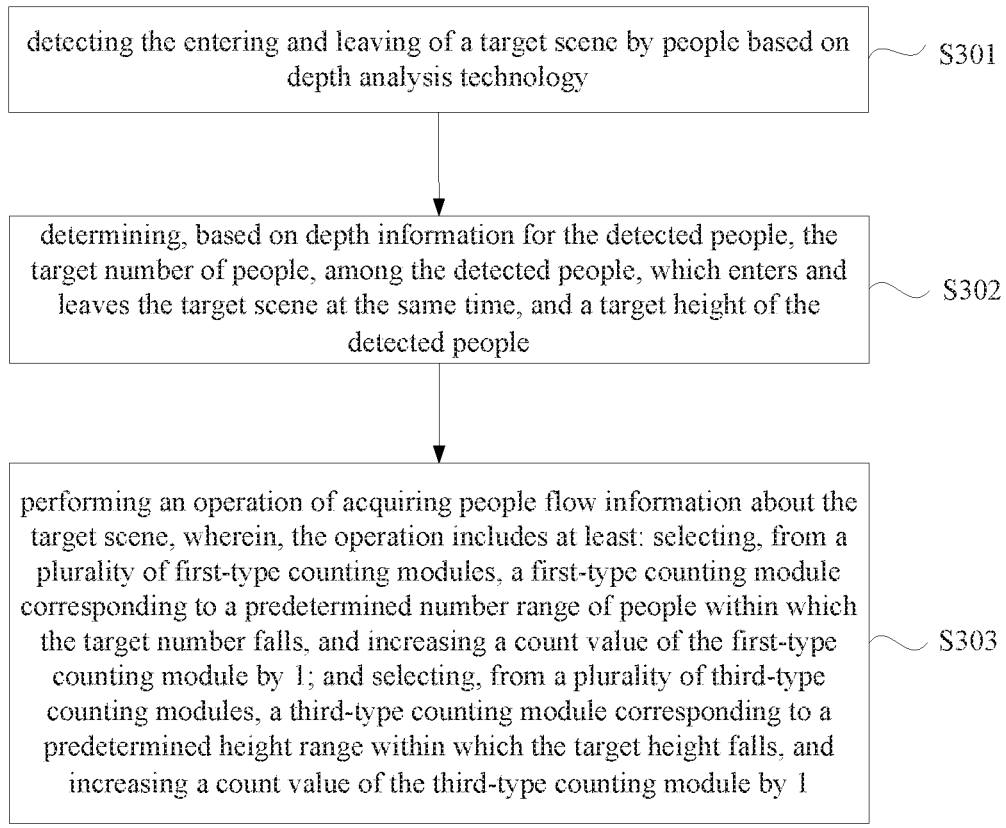
FIG. 3 is another flowchart of a method for acquiring people flow information provided by an embodiment of the present application.

As shown in FIG. 3, a method for acquiring people flow information provided by an embodiment of the present application may include:

S301, detecting entering and leaving of a target scene by people based on depth analysis technology.

In order to detect to the entering and leaving of a target scene by people, the depth sensor is required to be mounted on a position where it has such an acquisition range that the area within the target scene can be distinguished from the area external to the target scene.

The depth analysis technology is known in the art. The detection of entering and leaving of a target scene by people may thus be implemented based on through existing depth analysis technologies.

S302, determining, based on depth information corresponding to the detected people, the target number of people, among the detected people, which enters and leaves the target scene at the same time, and a target height of the detected people.

During the process of detecting to the entering and leaving of the target scene by people, specific attribute data of the people flow entering and leaving the target scene may be determined based on depth analysis technology. The specific attribute data may include the target number of people, among the detected people, which enters and leaves the target scene at the same time, and the target height of the detected people.

It is appreciated that, some of multiple people detected may be considered to enter and leave the target scene at the same time if they correspond to the same depth information. In this case, the target number of people that enters and leaves the target scene at the same time may be determined to be the number of these people. However, one person may be considered to enter or leave the target scene alone if depth information for this person is different from depth information for other people. In this case, the target number of people entering and leaving the target scene at the same time is determined to be 1.

S303, performing an operation of acquiring people flow information about the target scene, wherein, the operation of acquiring people flow information about the target scene includes at least: selecting, from a plurality of first-type counting modules, a first-type counting module corresponding to a predetermined number range of people within which the target number falls, and increasing the count value of the first-type counting module by 1; and selecting, from a plurality of third-type counting modules, a third-type counting module corresponding to a predetermined height range within which the target height falls, and increasing the count value of the third-type counting module by 1.

Wherein, each of the first-type counting modules corresponds to one of predetermined number ranges of people, and each of the third-type counting modules corresponds to one of predetermined height ranges.

After the target number of people, among the detected people, which enters and leaves the target scene at the same time and the target height of the detected people have been determined, a first-type counting module corresponding to a predetermined number range of people within which the target number falls may be selected from a plurality of first-type counting modules, and the count value of the first-type counting module is increased by 1; and a third-type counting module corresponding to a predetermined height range within which the target height falls may be selected from a plurality of third-type counting modules, and the count value of the third-type counting module is increased by 1.

It is noted that, a plurality of the first-type counting modules may be preset in the embodiment, each corresponding to one predetermined number range of people. When the target number falls within a predetermined number range of people, the first-type counting module corresponding to the predetermined number range of people is selected, and the count value of the first-type counting module is increased by 1. For example, a predetermined number range of 1 corresponds to a first-type counting module that is a one-people counting module. When a target number is determined to be 1, the count value of the one-people counting module is increased by 1. A predetermined number range of 2 corresponds to a first-type counting module that is a two-people counting module. When a target number is determined to be 2, the count value of the two-people counting module is increased by 1. A predetermined number range of 3 corresponds to a first-type counting module that is a three-people counting module. When a target number is determined to be 3, the count value of the three-people counting module is increased by 1. A predetermined number range of more than 3 corresponds to a first-type counting module that is a multi-people counting module. When a target number is determined to be 4 or more than 4, the count value of the multi-people counting module is increased by 1.

Similarly, a plurality of the third-type counting modules may be preset in the embodiment, each corresponding to one predetermined height range. When the target height falls within a predetermined height range, the third-type counting module corresponding to the predetermined height range is selected, and the count value of this third-type counting module is increased by 1. For example, a predetermined height range of (150 cm-160 cm] corresponds to a third-type counting module that is a first-height counting module. When the target height determined is in (150 cm-160 cm], the count value of the first-height counting module is increased by 1. A predetermined height range of (160 cm-170 cm] corresponds to a third-type counting module that is a second-height counting module. When the target height determined is in (160 cm-170 cm], the count value of the second-height counting module is increased by 1. A predetermined height range of greater than 170 cm corresponds to a third-type counting module that is a third-height counting module. When the target height determined is greater than 170 cm, the count value of the third-height counting module is increased by 1.

It is appreciated that, the first-type counting module and the third-type counting module may be provided in a people flow information acquiring device, or connected externally to a people flow information acquiring device. These are feasible.

In a specific implementation, the operation of storing, by taking a time period as index information, the relationship between the count value of each first-type counting module and the corresponding predetermined number range of people may be periodically performed. Also, the operation of storing, by taking a time period as index information, the relationship between the count value of each third-type counting module and the corresponding predetermined height range may be periodically performed. After the operation of storing is finished, the count value of each of the first-type counting modules and the third-type counting modules is reset. As an example, for a period of 1 minute, the operation of storing, by taking a time period as index information, the relationship between the count value of each first-type counting module and the corresponding predetermined number range of people may be periodically performed, and the operation of storing, by taking a time period as index information, the relationship between the count value of each third-type counting module and the corresponding predetermined height range may be periodically performed. The storage form for the first-type counting modules and the third-counting modules may be as shown in Table 1.

It is noted that, multiple first-type counting modules may share a total counting module for acquiring the actual number of the people. In addition, the relationship between the count value of each first-type counting module and the corresponding predetermined number range of people, and the relationship between the count value of each third-type counting module and the corresponding predetermined height range may be stored locally in the people flow information acquiring device, or may be stored in other devices. These are all feasible.

Thus, in comparison with the people flow information acquiring device provided by the embodiment including S101-S103, more specific attribute data may be obtained by people flow information acquisition in the present embodiment. Therefore, the value of the acquired people flow information in business analysis, deep data mining and so on may be further improved.

Figure 4:
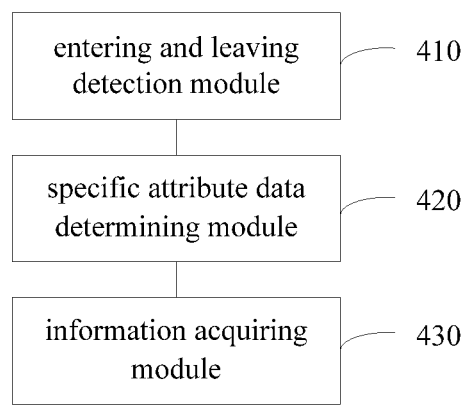
FIG. 4 is a structural schematic diagram of an apparatus for acquiring people flow information provided by an embodiment of the present application.

In accordance with the method embodiments described above, an apparatus for acquiring people flow information is provided, which is applicable to a people flow information acquiring device. As shown in FIG. 4, the apparatus includes:

an entering and leaving detection module 410, configured to detect entering and leaving of a target scene by people;

a specific attribute data determining module 420, configured to determine specific attribute data of people flow entering and leaving the target scene, wherein, the specific attribute data includes at least a target number of people, among the detected people, which enters and leaves the target scene at the same time; and an information acquiring module 430, configured to perform an operation of acquiring people flow information about the target scene, wherein, the operation of acquiring people flow information about the target scene includes at least:

selecting, from a plurality of first-type counting modules, a first-type counting module corresponding to a predetermined number range of people within which the target number falls, and increasing the count value of the first-type counting module by 1, wherein each first-type counting module corresponds to one predetermined number range of people.

In the embodiment, instead of merely obtaining a total number of people that enters and leaves a target scene within a time period, specific attribute data of the people flow entering and leaving the target scene are determined. The specific attribute data includes at least a target number of people, among the detected people, which enters and leaves the target scene at the same time. As such, a first-type counting module corresponding to a predetermined number range of people within which the target number falls may be selected from a plurality of first-type counting modules, and the count value of the selected first-type counting module is then increased by 1. Thus, the purpose of acquiring people flow information having a higher value in terms of business analysis, deep data mining and so on can be achieved by the solutions above.

In one implementation, the people flow information acquiring device includes an image acquiring device;

the entering and leaving detection module 410 may include:

a first entering and leaving detection unit, configured to detect, based on video analysis technology, the entering and leaving of the target scene by people.

In the case where the people flow information acquiring device includes an image acquiring device, the specific attribute data determining module 420 may include:

a first specific attribute data determining unit, configured to determine, based on time information for the detected people, the target number of people, among the detected people, which enters and leaves the target scene at the same time.

In the case where the people flow information acquiring device includes an image acquiring device, the specific attribute data may further include: a target clothing color of the detected people;

the specific attribute data determining module 420 may include:

a second specific attribute data determining unit, configured to determine, based on time information for the detected people, the target number of people, among the detected people, which enters and leaves the target scene at the same time; and determine the target clothing color of the detected people based on image analysis technology.

Accordingly, the operation of acquiring people flow information about the target scene may further include:

selecting, from a plurality of second-type counting modules, a second-type counting module corresponding to a predetermined color range within which the target clothing color falls, and increasing a count value of the second-type counting module by 1, wherein, each of the second-type counting modules corresponds to one of predetermined color ranges.

In another implementation, the people flow information acquiring device includes an infrared detection device;

the entering and leaving detection module 410 may include:

a second entering and leaving detection unit, configured to detect, based on infrared detection technology, the entering and leaving of the target scene by people.

Accordingly, the specific attribute data determining module 420 may include:

a third specific attribute data determining unit, configured to determine, based on distance information between the infrared detection device and the detected people, the target number of people, among the detected people, which enters and leaves the target scene at the same time.

In another implementation, the people flow information acquiring device includes a depth analysis device;

the entering and leaving detection module 410 may include:

a third entering and leaving detection unit, configured to detect, based on depth analysis technology, the entering and leaving of the target scene by people.

In the case where the people flow information acquiring device includes a depth analysis device, the specific attribute data determining module 420 may include:

a fourth specific attribute data determining unit, configured to determine, based on depth information corresponding to the detected people, the target number of people, among the detected people, which enters and leaves the target scene at the same time.

In the case where the people flow information acquiring device includes a depth analysis device, the specific attribute data further includes a target height of the detected people;

the specific attribute data determining module 420 may include:

a fifth specific attribute data determining unit, configured to determine, based on depth information corresponding to the detected people, the target number of people, among the detected people, which enters and leaves the target scene at the same time, and the target height of the detected people.

Accordingly, the operation of acquiring people flow information about the target scene may further include:

selecting, from a plurality of third-type counting modules, a third-type counting module corresponding to a predetermined height range within which the target height falls, and increasing a count value of the third-type counting module by 1, wherein each of the third-type counting modules corresponds to one of predetermined height ranges.

In one implementation, for the embodiment including only the first-type counting modules, the apparatus for acquiring people flow information may include:

a first storage module, configured to perform periodically an operation of storing, by taking a time period as index information, the relationship between a count value of each first-type counting module and a corresponding predetermined number range of people, and reset the count value of each first-type counting module after the operation of storing is finished.

In one implementation, for the embodiment including the first-type counting modules and the second-type counting modules, the apparatus for acquiring people flow information may include:

a second storage module, configured to perform periodically an operation of storing, by taking a time period as index information, the relationship between a count value of each first-type counting module and a corresponding predetermined number range of people, and an operation of storing, by taking a time period as index information, the relationship between a count value of each second-type counting module and a corresponding predetermined color range, and reset the count value of each of the first-type counting modules and the second-type counting modules after the operation of storing is finished.

In one implementation, for the embodiment including the first-type counting modules and the third-type counting modules, the apparatus for acquiring people flow information may include:

a third storage module, configured to perform periodically an operation of storing, by taking a time period as index information, the relationship between a count value of each first-type counting module, and an operation of storing, by taking a time period as index information, the corresponding predetermined number range of people and the relationship between a count value of each third-type counting module and the corresponding predetermined height range, and reset the count value of each of the first-type counting modules and the third-type counting modules after the operation of storing is finished.

Based on the method for acquiring people flow information described above, a method for processing people flow information, which is applicable to a people flow information processing device, is further provided by an embodiment of the present application.

It is noted that, the people flow information processing device and the people flow information acquiring device may be included in the same single device, or included in different devices. These are feasible.

Figure 5:
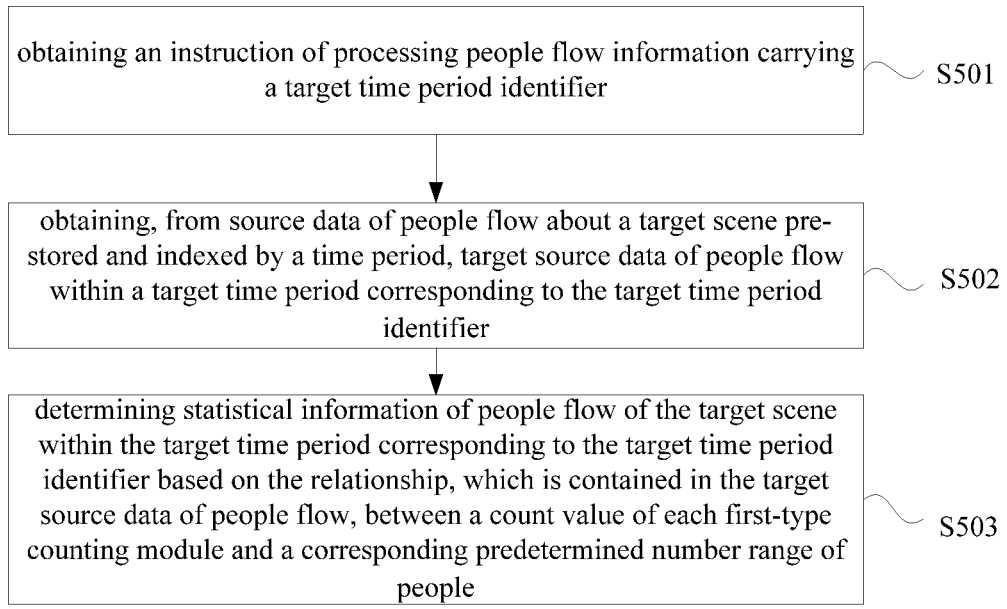
FIG. 5 is a flowchart of a method for processing people flow information provided by an embodiment of the present application.

As shown in FIG. 5, a method for processing people flow information provided by an embodiment of the present application may include:

S501, obtaining an instruction of processing people flow information, which carries a target time period identifier.

The instruction of processing people flow information may be issued by performing a predefined operation by a user, or may be issued automatically when a preset condition is satisfied. The preset condition may be set by a user in advance.

S502, obtaining, from people flow source data about a target scene pre-stored and indexed by a time period, target source data of people flow within a target time period corresponding to the target time period identifier.

After the instruction of processing people flow information is obtained, in order to obtain people flow information through statistics, target source data of people flow within a target period corresponding to the target time period identifier may be obtained from people flow source data about a target scene pre-stored and indexed by a time period. Wherein, the target source data of people flow may be determined based on the method for acquiring people flow information provided by embodiments of the present application, and may include at least the relationship between the count value of each first-type counting module and the corresponding predetermined number range of people. Each of the first-type counting modules corresponds to one of predetermined number ranges of people, which are ranges of the number of people that enters and leaves the target scene at the same time.

It is noted that, in one implementation, before obtaining the instruction of processing people flow information, the method may further include:

obtaining periodically the source data of people flow about the target scene from the people flow information acquiring device, and storing the obtained source data of people flow about the target scene by taking a time period as index information.

Accordingly, obtaining, from people flow source data about a target scene pre-stored and indexed by a time period, target source data of people flow within a target time period corresponding to the target time period identifier may include:

obtaining, from source data of people flow about the target scene locally pre-stored and indexed by a time period, target source data of people flow within a target time period corresponding to the target time period identifier.

In this implementation, the people flow information acquiring device serves as both a storage device and a processing device.

In another implementation, obtaining, from source data of people flow about a target scene pre-stored and indexed by a time period, target source data of people flow within a target time period corresponding to the target time period identifier:

obtaining, from source data of people flow about the target scene pre-stored in an external storage device and indexed by a time period, target source data of people flow within a target time period corresponding to the target time period identifier.

The external storage device obtains periodically the source data of people flow about the target scene from the people flow information acquiring device, and storing the obtained source data of people flow about the target scene by taking a time period as index information.

In this implementation, the storage device may be separate from the people flow information acquiring device and the people flow information processing device, or included in the same device with the people flow information acquiring device. These are feasible.

S503, determining statistical information of people flow of the target scene within a target time period corresponding to the target time period identifier based on the relationship between the count value of each first-type counting module and the corresponding predetermined number range of people, contained in the target source data of people flow.

After the target source data of people flow has been obtained, the statistical information of people flow of the target scene within a target time period corresponding to the target time period identifier may be determined based on the relationship between the count value of each first-type counting module and the corresponding predetermined number range of people, contained in the target source data of people flow.

In particular, in one implementation, determining statistical information of people flow of the target scene within a target time period corresponding to the target time period identifier based on the relationship between the count value of each first-type counting module and the corresponding predetermined number range of people, contained in the target source data of people flow, may include: determining, based on the relationship, which is contained in the people flow target source data, between the count value of each first-type counting module and the corresponding predetermined number range of people, the ratio between the number of people for each predetermined number range of people and the total number of people in the target scene within the target time period corresponding to the target time period identifier. It is noted that, the implementation provided by the present embodiment, where statistical information of people flow of the target scene within a target time period corresponding to the target time period identifier is determined based on the relationship between the count value of each first-type counting module and the corresponding predetermined number range of people, contained in the target source data of people flow, is merely provided as an example and is not intended to limit embodiments of the present application.

In one implementation, the source data of people flow may further include: the relationship between the count value of each second-type counting module and the corresponding predetermined color range, wherein, each second-type counting module corresponds to one of predetermined color ranges, which are ranges of clothing colors of people.

Accordingly, determining statistical information of people flow of the target scene within a target time period corresponding to the target time period identifier based on the relationship between the count value of each first-type counting module and the corresponding predetermined number range of people, contained in the target source data of people flow, may include:

determining the statistical information of people flow of the target scene within a target time period corresponding to the target time period identifier based on the relationship between the count value of each first-type counting module and the corresponding predetermined number range of people and the relationship between the count value of each second-type counting module and the corresponding predetermined color range, contained in the target source data of people flow.

In particular, in one implementation, determining the statistical information of people flow of the target scene within a target time period corresponding to the target time period identifier based on the relationship between the count value of each first-type counting module and the corresponding predetermined number range of people and the relationship between the count value of each second-type counting module and the corresponding predetermined color range, contained in the target source data of people flow may include: determining, based on the relationship, which is contained in the target source data of people flow, between the count value of each first-type counting module and the corresponding predetermined number range of people, the ratio between the number of people for each predetermined number range of people and the total number of people in the target scene within a target time period corresponding to the target time period identifier; and determining, based on the relationship, which is contained in the target source data of people flow, between the count value of each second-type counting module and the corresponding predetermined color range, the ratio between the number of people for each predetermined color range and the total number of people in the target scene within a target time period corresponding to the target time period identifier. It is noted that, the implementation provided by the present embodiment, where the statistical information of people flow of the target scene within a target time period corresponding to the target time period identifier is determined based on the relationship between the count value of each first-type counting module and the corresponding predetermined number range of people and the relationship between the count value of each second-type counting module and the corresponding predetermined color range, contained in the target source data of people flow, is merely an example and not intended to limit embodiments of the present application.

In one implementation, the source data of people flow may further include: the relationship between the count value of each third-type counting module and the corresponding predetermined height range, wherein, each third-type counting module corresponds to one of predetermined height ranges, which are ranges of heights of people in the embodiment.

Accordingly, determining statistical information of people flow of the target scene within a target time period corresponding to the target time period identifier based on the relationship between the count value of each first-type counting module and the corresponding predetermined number range of people, contained in the target source data of people flow may include:

determining, based on the relationship between the count value of each first-type counting module and the corresponding predetermined number range of people and the relationship between the count value of each third-type counting module and the corresponding predetermined height range contained in the target source data of people flow, statistical information of people flow of the target scene within the target time period corresponding to the target time period identifier.

In particular, in one implementation, determining, based on the relationship between the count value of each first-type counting module and the corresponding predetermined number range of people and the relationship between the count value of each third-type counting module and the corresponding predetermined height range contained in the target source data of people flow, statistical information of people flow of the target scene within the target time period corresponding to the target time period identifier, may include: determining, based on the relationship, which is contained in the target source data of people flow, between the count value of each first-type counting module and the corresponding predetermined number range of people, the ratio between the number of people for each predetermined number range of people and the total number of people in the target scene within the target time period corresponding to the target time period identifier; and determining, based on the relationship, which is contained in the target source data of people flow, between the count value of each third-type counting module and the corresponding predetermined height range, the ratio between the number of people for each predetermined height range and the total number of people in the target scene within the target time period corresponding to the target time period identifier. It is noted that, the implementation provided by the present embodiment, where based on the relationship between the count value of each first-type counting module and the corresponding predetermined number range of people and the relationship between the count value of each third-type counting module and the corresponding predetermined height range contained in the target source data of people flow, statistical information of people flow of the target scene within the target time period corresponding to the target time period identifier is determined, is merely an example and not intended to limit embodiments of the present application.

In this embodiment, the statistical processing of people flow information acquired by the method for acquiring people flow information provided by embodiments of the present application is performed, thus reference data for business analysis, deep data mining and so on is further provided.

Figure 6:
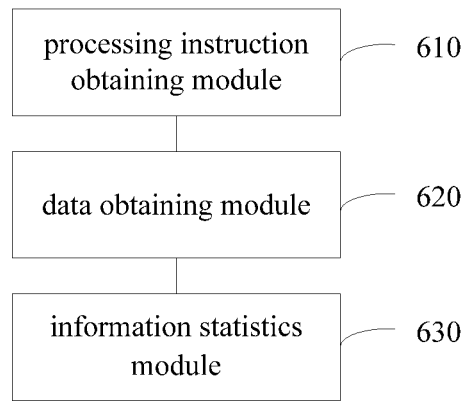
FIG. 6 is a structural schematic diagram of an apparatus for processing people flow information provided by an embodiment of the present application.

In accordance with the method for processing people flow information described above, an apparatus for processing people flow information is also provided in an embodiment of the present application, which is applicable to a people flow information processing device. As shown in FIG. 6, the apparatus includes:

a processing instruction obtaining module 610, configured to obtain an instruction of processing people flow information, which carries a target time period identifier;

a data obtaining module 620, configured to obtain, from source data of people flow about a target scene pre-stored and indexed by a time period, target source data of people flow within a target time period corresponding to the target time period identifier; wherein, the source data of people flow is determined based on the method for acquiring people flow information of claim 1, and includes at least the relationship between the count value of each first-type counting module and the corresponding predetermined number range of people, wherein, each of the first-type counting modules corresponds to one of predetermined number ranges of people, which are ranges of the number of people that enters and leaves the target scene at the same time; and an information statistics module 630, configured to determine statistical information of people flow of the target scene within the target time period corresponding to the target time period identifier based on the relationship, which is contained in the target source data of people flow, between the count value of each first-type counting module and the corresponding predetermined number range of people.

In this embodiment, the statistical processing of people flow information acquired by the method for acquiring people flow information provided by embodiments of the present application is performed, thus reference data for business analysis, deep data mining and so on is further provided.

In one implementation, the apparatus for processing people flow information provided by the embodiment of the present application may further include:

a data storage module, configured to obtain periodically, before the instruction of processing people flow information is obtained, the source data of people flow about the target scene from the people flow information acquiring device, and store the obtained source data of people flow about the target scene by taking a time period as index information.

Accordingly, the data obtaining module 620 is specifically configured to:

obtain, from source data of people flow about a target scene locally pre-stored and indexed by a time period, target source data of people flow within a target time period corresponding to the target time period identifier.

In another embodiment, the data obtaining module 620 is specifically configured to:

obtain, from source data of people flow about the target scene pre-stored in an external storage device and indexed by a time period, target source data of people flow within the target time period corresponding to the target time period identifier.

Wherein, the external storage device obtains periodically the source data of people flow about the target scene from the people flow information acquiring device, and stores the obtained source data of people flow about the target scene by taking a time period as index information.

In particular, the information statistics module 630 may include:

a first information statistics unit, configured to determine, based on the relationship, which is contained in the target source data of people flow, between the count value of each first-type counting module and the corresponding predetermined number range of people, the ratio between the number of people for each predetermined number range of people and the total number of people in the target scene within a target time period corresponding to the target time period identifier.

In one implementation, the source data of people flow may further include: the relationship between the count value of each second-type counting module and the corresponding predetermined color range, wherein, each second-type counting module corresponds to one of predetermined color ranges, which are ranges of clothing colors of people.

Accordingly, the information statistics module 630 may include:

a second information statistics unit, configured to determine statistical information of people flow of the target scene within the target time period corresponding to the target time period identifier based on the relationship between the count value of each first-type counting module and the corresponding predetermined number range of people and the relationship between the count value of each second-type counting module and the corresponding predetermined color range, which are contained in the target source data of people flow.

In particular, the second information statistics unit is configured to:

determine, based on the relationship, which is contained in the target source data of people flow, between the count value of each first-type counting module and the corresponding predetermined number range of people, the ratio between the number of people for each predetermined number range of people and the total number of people in the target scene within the target time period corresponding to the target time period identifier; and determine, based on the relationship, which is contained in the target source data of people flow, between the count value of each second-type counting module and the corresponding predetermined color range, the ratio between the number of people for each predetermined color range and the total number of people in the target scene within the target time period corresponding to the target time period identifier.

In one implementation, the source data of people flow may further include the relationship between the count value of each third-type counting module and the corresponding predetermined height range, wherein, each third-type counting module corresponds to one of predetermined height ranges, which are ranges of heights of people.

Accordingly, the information statistics module 630 may include:

a third information statistics unit, configured to determine, based on the relationship between the count value of each first-type counting module and the corresponding predetermined number range of people and the relationship between the count value of each third-type counting module and the corresponding predetermined range, which are contained in the target source data of people flow, the statistical information of people flow of the target scene within the target time period corresponding to the target time period identifier.

In particular, the third information statistics unit is configured to:

determine, based on the relationship, which is contained in the target source data of people flow, between the count value of each first-type counting module and the corresponding predetermined number range of people, the ratio between the number of people for each predetermined number range of people and the total number of people in the target scene within the target time period corresponding to the target time period identifier; and determine, based on the relationship, which is contained in the target source data of people flow, between the count value of each third-type counting module and the corresponding predetermined height range, the ratio between the number of people for each predetermined height range and the total number of people in the target scene within the target time period corresponding to the target time period identifier.

In addition, corresponding to the method for acquiring people flow information provided by the embodiments described above, a storage medium is provided by an embodiment of the present application. The storage medium is configured to store an application program, which, when being executed, performs the method for acquiring people flow information as provided by embodiments of the present application. Specifically, the method for acquiring people flow information includes:

detecting entering and leaving of a target scene by people;

determining specific attribute data of people flow entering and leaving the target scene, wherein, the specific attribute data includes at least a target number of people, among the detected people, which enters and leaves the target scene at the same time; and performing an operation of acquiring people flow information about the target scene, wherein, the operation of acquiring people flow information about the target scene includes at least:

selecting, from a plurality of first-type counting modules, a first-type counting module corresponding to a predetermined number range of people within which the target number falls, and increasing a count value of the first-type counting module by 1, wherein each of the first-type counting modules corresponds to one of predetermined number ranges of people.

In this embodiment, the storage medium stores an application program, which, when being executed, performs the method for acquiring people flow information provided by embodiments of the present application. Therefore, the purpose of acquiring people flow information having a higher value in terms of business analysis, deep data mining and so on can be achieved.

In addition, corresponding to the method for processing people flow information provided by the embodiments described above, a storage medium is provided by an embodiment of the present application. The storage medium is configured to store an application program, which, when being executed, performs the method for processing people flow information as provided by embodiments of the present application. Specifically, the method for processing people flow information includes:

obtaining an instruction of processing people flow information, which carries a target time period identifier;

obtaining, from source data of people flow about a target scene pre-stored and indexed by a time period, target source data of people flow within a target time period corresponding to the target time period identifier; wherein, the source data of people flow is determined based on the method for acquiring people flow information of claim 1, and includes at least the relationship between a count value of each first-type counting module and a corresponding predetermined number range of people, wherein, each of the first-type counting modules corresponds to one of predetermined number ranges of people, which are ranges of the number of people that enters and leaves the target scene at the same time; and determining statistical information of people flow of the target scene within the target time period corresponding to the target time period identifier based on the relationship, which is contained in the target source data of people flow, between a count value of each first-type counting module and a corresponding predetermined number range of people.

In this embodiment, the storage medium stores an application program, which, when being executed, performs the method for processing people flow information provided by embodiments of the present application. Therefore, the statistical processing of the people flow information acquired based on the method for acquiring people flow information provided by embodiments of the present application can be performed, thus reference data for business analysis, deep data mining and so on is further provided.

In addition, corresponding to the method for acquiring people flow information provided by the embodiments described above, an application program is provided by an embodiment of the present application. The application program is configured to, when executed, performs the method for acquiring people flow information as provided by embodiments of the present application. Specifically, the method for acquiring people flow information includes:

detecting entering and leaving of a target scene by people;

determining specific attribute data of people flow entering and leaving the target scene, wherein, the specific attribute data includes at least a target number of people, among the detected people, which enters and leaves the target scene at the same time; and performing an operation of acquiring people flow information about the target scene, wherein, the operation of acquiring people flow information about the target scene includes at least:

selecting, from a plurality of first-type counting modules, a first-type counting module corresponding to a predetermined number range of people within which the target number falls, and increasing a count value of the first-type counting module by 1, wherein each of the first-type counting modules corresponds to one of predetermined number ranges of people.

In this embodiment, the application program, when being executed, performs the method for acquiring people flow information provided by embodiments of the present application. Therefore, the purpose of acquiring people flow information having a higher value in terms of business analysis, deep data mining and so on can be achieved.

In addition, in accordance with the method for processing people flow information provided by the embodiments described above, an application program is provided by another embodiment of the present application. The application program is configured to, when executed, performs the method for processing people flow information as provided by embodiments of the present application. Specifically, the method for processing people flow information includes:

obtaining an instruction of processing people flow information, which carries a target time period identifier;

obtaining, from source data of people flow about a target scene pre-stored and indexed by a time period, target source data of people flow within a target time period corresponding to the target time period identifier; wherein, the source data of people flow is determined based on the method for acquiring people flow information of claim 1, and includes at least the relationship between a count value of each first-type counting module and a corresponding predetermined number range of people, wherein, each of the first-type counting modules corresponds to one of predetermined number ranges of people, which are ranges of the number of people that enters and leaves the target scene at the same time; and determining statistical information of people flow of the target scene within the target time period corresponding to the target time period identifier based on the relationship, which is contained in the target source data of people flow, between a count value of each first-type counting module and a corresponding predetermined number range of people.

In this embodiment, the application program, when being executed, performs the method for processing people flow information provided by embodiments of the present application. Therefore, the statistical processing of the people flow information acquired based on the method for acquiring people flow information provided by embodiments of the present application can be performed, thus reference data for business analysis, deep data mining and so on is further provided.

In addition, corresponding to the method for acquiring people flow information provided by the embodiments described above, a people flow information acquiring device is provided by an embodiment of the present application, wherein the device includes a processor, a memory, a communication interface, and a bus;

the processor, the memory, and the communication interface are communicatively connected with each other by the bus;

the memory is configured to store executable program codes;

the processor is configured to execute a program corresponding to the executable program codes by reading the executable program codes stored in the memory, in order to perform the method for acquiring people flow information provided by embodiments of the present application. The method includes:

detecting entering and leaving of a target scene by people;

determining specific attribute data of people flow entering and leaving the target scene, wherein, the specific attribute data includes at least a target number of people, among the detected people, which enters and leaves the target scene at the same time; and performing an operation of acquiring people flow information about the target scene, wherein, the operation of acquiring people flow information about the target scene includes at least:

selecting, from a plurality of first-type counting modules, a first-type counting module corresponding to a predetermined number range of people within which the target number falls, and increasing a count value of the first-type counting module by 1, wherein each of the first-type counting modules corresponds to one of predetermined number ranges of people.

Wherein, the people flow information acquiring device may include an image acquiring device, an infrared detection device, a depth sensor, or the like. In particular, the image acquiring device may be a smart camera or a terminal with video acquisition and analysis capabilities, and the infrared detection device may be an infrared curtain device. All these are feasible.

In this embodiment, the processor of the people flow information acquiring device is configured to execute a program corresponding to the executable program codes by reading the executable program codes stored in the memory. The program is configured to, when executed, perform the method for acquiring people flow information provided by embodiments of the present application. Thus, the purpose of acquiring people flow information having a higher value in terms of business analysis, deep data mining and so on can be achieved.

In addition, corresponding to the method for processing people flow information provided by the embodiments described above, a people flow information processing device is provided by an embodiment of the present application, wherein the device includes a processor, a memory, a communication interface, and a bus;

the processor, the memory, and the communication interface are communicatively connected with each other by the bus;

the memory is configured to store executable program codes;

the processor is configured to execute a program corresponding to the executable program codes by reading the executable program codes stored in the memory, in order to perform the method for processing people flow information. The method includes:

obtaining an instruction of processing people flow information, which carries a target time period identifier;

obtaining, from source data of people flow about a target scene pre-stored and indexed by a time period, target source data of people flow within a target time period corresponding to the target time period identifier; wherein, the source data of people flow is determined based on the method for acquiring people flow information of claim 1, and includes at least the relationship between a count value of each first-type counting module and a corresponding predetermined number range of people, wherein, each of the first-type counting modules corresponds to one of predetermined number ranges of people, which are ranges of the number of people that enters and leaves the target scene at the same time; and determining statistical information of people flow of the target scene within the target time period corresponding to the target time period identifier based on the relationship, which is contained in the target source data of people flow, between a count value of each first-type counting module and a corresponding predetermined number range of people.

Wherein, the people flow information processing device and the people flow information acquiring device may be included in the same device, or may be included in different devices. These are feasible.

In this embodiment, the processor of the people flow information processing device is configured to execute a program corresponding to the executable program codes by reading the executable program codes stored in the memory. The program is configured to, when executed, perform the method for processing people flow information provided by embodiments of the present application. Therefore, the statistical processing of the people flow information acquired based on the method for acquiring people flow information provided by embodiments of the present application can be performed, thus reference data for business analysis, deep data mining and so on is further provided.

Only a brief introduction of the embodiments of the people flow information acquiring device, the people flow information processing device, the application programs and storage mediums is provided, because the related content of method is substantially similar with previous method embodiments. For details, reference may be made to the description in the method embodiments.

It should be noted that the relationship terms use here, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s) a/an . . . " do not exclude additional identical elements in the processes, methods, articles, or devices, including the listed elements.

All of the embodiments in the description are described in a correlated manner, and identical or similar parts in various embodiments can refer to one another. In addition, the description for each embodiment focuses on the differences from other embodiments. In particular, the embodiment of the system is described briefly, since it is substantially similar to the embodiment of the method, and the related contents can refer to the description of the embodiment of the method.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

What is claimed is:

1. A method for acquiring people flow information, which is applicable to a people flow information acquiring device, comprising:

detecting entering and leaving of a target scene by people;

determining specific attribute data of people flow entering and leaving the target scene, wherein, the specific attribute data includes at least a target number of people, among the detected people, which enters and leaves the target scene at the same time, wherein the people entering and leaving the target scene at the same time indicates n persons in the people enters the target scene and at the exact moment m persons in the people leaves the target scene, wherein n is larger than or equal to 0, m is larger than or equal to 0, and the sum of n and m is equal to the target number of people; and performing an operation of acquiring people flow information about the target scene, wherein, the operation of acquiring people flow information about the target scene includes at least:

selecting, from a plurality of first-type counting modules, a first-type counting module corresponding to a predetermined number range of people within which the target number falls, and increasing a count value of the first-type counting module by 1, wherein each of the first-type counting modules corresponds to one of predetermined number ranges of people.

2. The method of claim 1, wherein, the people flow information acquiring device comprises an image acquiring device; and detecting entering and leaving of a target scene by people comprises:

detecting, based on a video analysis technology, the entering and leaving of the target scene by people.

3. The method of claim 2, wherein, determining specific attribute data of people flow entering and leaving the target scene, wherein, the specific attribute data includes at least a target number of people, among the detected people, which enters and leaves the target scene at the same time, comprises:

determining, based on time information for the detected people, the target number of people, among the detected people, which enters and leaves the target scene at the same time;

or wherein, the specific attribute data further comprises:

a target clothing color of the detected people;

determining specific attribute data of people flow entering and leaving the target scene, wherein, the specific attribute data includes at least a target number of people, among the detected people, which enters and leaves the target scene at the same time, comprises:

determining, based on time information for the detected people, the target number of people, among the detected people, which enters and leaves the target scene at the same time; and determining a target clothing color of the detected people based on an image analysis technology; and the operation of acquiring people flow information about the target scene further comprises:

selecting, from a plurality of second-type counting modules, a second-type counting module corresponding to a predetermined color range within which the target clothing color falls, and increasing a count value of the second-type counting module by 1, wherein, each of the second-type counting modules corresponds to one of predetermined color ranges.

4. The method of claim 1, wherein, the people flow information acquiring device comprises an infrared detection device;
- detecting entering and leaving of a target scene by people comprises:
- detecting, based on an infrared detection technology, the entering and leaving of the target scene by people; and
- determining specific attribute data of people flow entering and leaving the target scene, wherein, the specific attribute data includes at least a target number of people, among the detected people, which enters and leaves the target scene at the same time, comprises:
- determining, based on distance information between the infrared detection device and the detected people, the target number of people, among the detected people, which enters and leaves the target scene at the same time.

5. The method of claim 1, wherein, the people flow information acquiring device comprises a depth analysis device; and
- detecting entering and leaving of a target scene by people comprises:
- detecting, based on a depth analysis technology, the entering and leaving of the target scene by people.

6. The method of claim 5, wherein, determining specific attribute data of people flow entering and leaving the target scene, wherein, the specific attribute data includes at least a target number of people, among the detected people, which enters and leaves the target scene at the same time, comprises:
- determining, based on depth information for the detected people, the target number of people, among the detected people, which enters and leaves the target scene at the same time;
- or wherein, the specific attribute data further comprises a target height of the detected people;
- determining specific attribute data of people flow entering and leaving the target scene, wherein, the specific attribute data includes at least a target number of people, among the detected people, which enters and leaves the target scene at the same time, comprises:
- determining, based on the depth information for the detected people, the target number of people, among the detected people, which enters and leaves the target scene at the same time, and a target height of the detected people; and
- the operation of acquiring people flow information about the target scene further comprises:
- selecting, from a plurality of third-type counting modules, a third-type counting module corresponding to a predetermined height range within which the target height falls, and increasing a count value of the third-type counting module by 1, wherein each of the third-type counting modules corresponds to one of predetermined height ranges.

7. The method of claim 1, further comprising:
- performing periodically an operation of storing, by taking a time period as index information, a relationship between a count value of each first-type counting module and a corresponding predetermined number range of people, and resetting the count value of each first-type counting module after the operation of storing is finished.

8. The method of claim 3, further comprising:
- performing periodically an operation of storing, by taking a time period as index information, a relationship between a count value of each first-type counting module and a corresponding predetermined number range of people, and an operation of storing, by taking a time period as index information, a relationship between a count value of each second-type counting module and a corresponding predetermined color range, and resetting the count value of each first-type counting module and the count value of each second-type counting module after these operations of storing are finished.

9. The method of claim 6, further comprising:
- performing periodically an operation of storing, by taking a time period as index information, a relationship between a count value of each first-type counting module and a corresponding predetermined number range of people, and an operation of storing, by taking a time period as index information, a relationship between a count value of each third-type counting module and a corresponding predetermined height range, and resetting the count value of each first-type counting module and the count value of each third-type counting module after these operations of storing are finished.

10. An apparatus for acquiring people flow information, which is applicable to a people flow information acquiring device, comprising:
- an entering and leaving detection module configured to detect entering and leaving of a target scene by people;
- a specific attribute data determining module configured to determine specific attribute data of people flow entering and leaving the target scene, wherein, the specific attribute data comprises at least a target number of people, among the detected people, which enters and leaves the target scene at the same time, wherein the people entering and leaving the target scene at the same time indicates n persons in the people enters the target scene and at the exact moment m persons in the people leaves the target scene, wherein n is larger than or equal to 0, m is larger than or equal to 0, and the sum of n and m is equal to the target number of people; and
- an information acquiring module configured to perform an operation of acquiring people flow information about the target scene, wherein, the operation of acquiring people flow information about the target scene comprises at least:
- selecting, from a plurality of first-type counting modules, a first-type counting module corresponding to a predetermined number range of people within which the target number falls, and increasing a count value of the first-type counting module by 1, wherein, each of the first-type counting modules corresponds to one of predetermined number ranges of people.

11. A method for processing people flow information, which is applicable to a people flow information processing device, comprising:
- obtaining an instruction of processing people flow information, which carries a target time period identifier;
- obtaining, from source data of people flow about a target scene pre-stored and indexed by a time period, target source data of people flow within a target time period corresponding to the target time period identifier; wherein, the source data of people flow is determined based on the method for acquiring people flow information of claim 1, and includes at least a relationship between a count value of each first-type counting module and a corresponding predetermined number range of people, wherein, each first-type counting module corresponds to one of predetermined number ranges of people, which are ranges of the number of people that enters and leaves the target scene at the same time; and determining statistical information of people flow of the target scene within the target time period corresponding to the target time period identifier based on the relationship, which is contained in the target source data of people flow, between a count value of each first-type counting module and a corresponding predetermined number range of people.

12. The method of claim 11, wherein, before obtaining an instruction of processing people flow information, the method further comprises:

obtaining periodically the source data of people flow about the target scene from a people flow information acquiring device, and storing the obtained source data of people flow about the target scene by taking a time period as index information;

obtaining, from source data of people flow about a target scene pre-stored and indexed by a time period, target source data of people flow within a target time period corresponding to the target time period identifier comprises:

obtaining, from source data of people flow about the target scene locally pre-stored and indexed by a time period, the target source data of people flow within the target time period corresponding to the target time period identifier;

or wherein, obtaining, from source data of people flow about a target scene pre-stored and indexed by a time period, target source data of people flow within a target time period corresponding to the target time period identifier comprises:

obtaining, from source data of people flow about the target scene pre-stored in an external storage device and indexed by a time period, the target source data of people flow within the target time period corresponding to the target time period identifier;

wherein, the external storage device obtains periodically the source data of people flow about the target scene from a people flow information acquiring device, and stores the obtained source data of people flow about the target scene by taking a time period as index information;

or wherein, determining statistical information of people flow of the target scene within the target time period corresponding to the target time period identifier based on the relationship, which is contained in the target source data of people flow, between a count value of each first-type counting module and a corresponding predetermined number range of people comprises:

determining a ratio between the number of people for each predetermined number range of people and the total number of people in the target scene within the target time period corresponding to the target time period identifier, based on the relationship, which is contained in the target source data of people flow, between a count value of each first-type counting module and a corresponding predetermined number range of people.

13. The method of claim 11, wherein, the source data of people flow further comprises: a relationship between a count value of each second-type counting module and a corresponding predetermined color range, wherein, each second-type counting module corresponds to one of predetermined color ranges, which are ranges of clothing colors of people;

determining statistical information of people flow of the target scene within the target time period corresponding to the target time period identifier based on the relationship, which is contained in the target source data of people flow, between a count value of each first-type counting module and a corresponding predetermined number range of people comprises:

determining the statistical information of people flow of the target scene within the target time period corresponding to the target time period identifier, based on the relationship between a count value of each first-type counting module and a corresponding predetermined number range of people and the relationship between a count value of each second-type counting module and a corresponding predetermined color range, which are contained in the target source data of people flow.

14. The method of claim 13, wherein, determining the statistical information of people flow of the target scene within the target time period corresponding to the target time period identifier, based on the relationship between a count value of each first-type counting module and a corresponding predetermined number range of people and the relationship between a count value of each second-type counting module and a corresponding predetermined color range, which are contained in the target source data of people flow, comprises:

determining a ratio between the number of people for each predetermined number range of people and the total number of people in the target scene within the target time period corresponding to the target time period identifier, based on the relationship, which is contained in the target source data of people flow, between a count value of each first-type counting module and a corresponding predetermined number range of people; and determining a ratio between the number of people for each predetermined color range and the total number of people in the target scene within the target time period corresponding to the target time period identifier, based on the relationship, which is contained in the target source data of people flow, between a count value of each second-type counting module and a corresponding predetermined color range.

15. The method of claim 11, wherein the source data of people flow further comprises a relationship between a count value of each third-type counting module and a corresponding predetermined height range, wherein, each third-type counting module corresponds to one of predetermined height ranges, which are ranges of heights of people;

determining statistical information of people flow of the target scene within the target time period corresponding to the target time period identifier based on the relationship, which is contained in the target source data of people flow, between a count value of each first-type counting module and a corresponding predetermined number range of people comprises:

determining the statistical information of people flow of the target scene within the target time period corresponding to the target time period identifier, based on the relationship between a count value of each first-type counting module and a corresponding predetermined number range of people and the relationship between a count value of each third-type counting module and a corresponding predetermined height range, which are contained in the target source data of people flow.

16. The method of claim 15, wherein, determining the statistical information of people flow of the target scene within the target time period corresponding to the target time period identifier, based on the relationship between a count value of each first-type counting module and a corresponding predetermined number range of people and the relationship between a count value of each third-type counting module and a corresponding predetermined height range, which are contained in the target source data of people flow, comprises:

determining a ratio between the number of people for each predetermined number range of people and the total number of people in the target scene within the target time period corresponding to the target time period identifier, based on the relationship, which is contained ii the target source data of people flow, between a count value of each first-type counting module and a corresponding predetermined number range of people; and determining a ratio between the number of people for each predetermined height range and the total number of people in the target scene within the target time period corresponding to the target time period identifier, based on the relationship, which is contained in the target source data of people flow, between a count value of each third-type counting module and a corresponding predetermined height range.

17. A storage medium configured to store an application program, which, when being executed, performs the method for acquiring people flow information according to claim 1.

18. A storage medium configured to store an application program, which, when being executed, performs the method for processing people flow information according to claim 11.

19. A people flow information acquiring device, comprising a processor, a memory, a communication interface, and a bus; wherein, the processor, the memory, and the communication interface are communicatively connected with each other by the bus;

the memory is configured to store executable program codes; and the processor is configured to execute a program corresponding to the executable program codes by reading the executable program codes stored in the memory, in order to perform the method for acquiring people flow information according to claim 1.

20. A people flow information processing device, comprising a processor, a memory, a communication interface, and a bus; wherein, the processor, the memory, and the communication interface are communicatively connected with each other by the bus;

the memory is configured to store executable program codes; and the processor is configured to execute a program corresponding to the executable program codes by reading the executable program codes stored in the memory, in order to perform the method for processing people flow information according to claim 11.

* * * * *